Feb. 26, 1963    J. E. STRAUB    3,079,517
OSCILLATING STEP-MOTOR
Filed Dec. 16, 1959

INVENTOR.
Joseph E. Straub
BY
Olson & Trexler
attys.

United States Patent Office 3,079,517
Patented Feb. 26, 1963

3,079,517
OSCILLATING STEP-MOTOR
Joseph E. Straub, Manhattan Beach, Calif., assignor to Illinois Tool Works, Inc., a corporation of Delaware
Filed Dec. 16, 1959, Ser. No. 859,924
7 Claims. (Cl. 310—37)

This invention relates to an improved rotary solenoid drive mechanism. More specifically, it relates to a rotary solenoid, which, when supplied a substantially continuous power source, will produce through its output shaft a substantially continuous regulated oscillatory motion.

Heretofore, electromagnetic devices which translated a linear movement of an armature into a rotary movement by various means were provided with output shafts which were moved a definite angular increment upon the application of a definite length impulse from a current source. Upon breaking the connection of this current source, the devices return to their initial position by mechanical means, usually springs, and would repeat the cycle only upon the introduction of another impulse of current sufficient to accomplish another cycle of operation of the device. In most instances, the rapidity of repeatability of the device was based solely upon the technique and ability of the operator who operated the mechanism.

Further, in the use of solenoid drive mechanisms for operating such devices as rotary switches, it has generally been a problem to retain the switches in the secondary or switched position to which the solenoid mechanism moves them. It is necessary that suitable means be provided to retain the switch or other device in secondary position while the solenoid returns to its initial condition. These problems have led one to the development of means described hereinafter which are the subject matter of the invention.

An object of this invention therefore is to provide an improved rotary solenoid device which, while simple in nature, can be economically adapted for use with a variety of work elements which require a succession of incremental rotary movements.

A more specific object of this invention is to provide a rotary solenoid which will continue to operate in an intermittent or oscillatory fashion so long as power is supplied to the device.

A further object is to provide an improved ratchet and detent mechanism which, in cooperation with the solenoid, will permit and enlarge the possible uses of the incremental motion provided.

Still another object of this invention is to provide a simple economical device which does not require an undue amount of maintenance and which is compact in physical size for mounting in the normally cramped environment that such devices are used.

Other objects will become more apparent when the accompanying specification is read with the drawings wherein.

Figure 1:
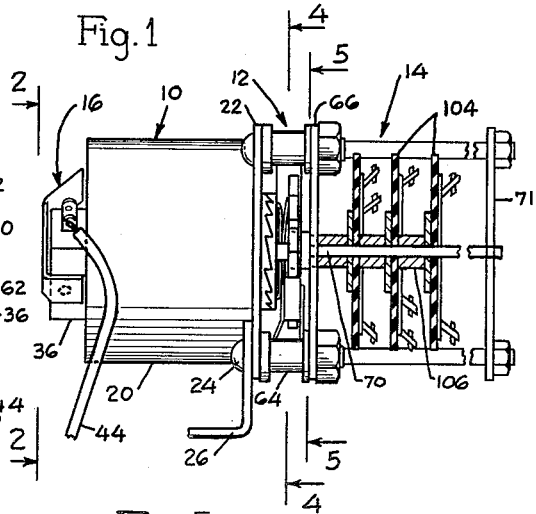
FIG. 1 is a side elevation of a device embodying the principles of this invention.

Referring now to the drawings, and in particular to FIG. 1, a rotary solenoid drive mechanism of the type contemplated by this invention generally includes a rotary solenoid 10, a ratchet or escapement assembly 12, a workpiece or work element 14, and in this particular embodiment of the invention the oscillating controls 16.

The rotary solenoid 10 can be of any type generally found on the commercial market, and, if desired, can assume the form shown in my co-pending application, Serial No. 532,681, filed September 6, 1955. Generally such a rotary solenoid includes a case 20 and a mounting plate 22 positioned adjacent one end of the solenoid and having a plurality of apertures for the acceptance of fastening means such as screws 24 utilized in the mounting of the solenoid. In the present instance, a secondary flange mounting element 26 is provided so that the drive assembly can be mounted parallel to a panel, if desired. Rotary solenoids generally are electro-magnetic devices each of which includes a core, coil windings about said core to induce a magnetic field, an armature for linear movement towards or within said core, suitable means for translating said linear movement into an incremental rotary movement of an output shaft upon energization of said solenoid, and means for returning said output shaft to its initial position upon de-energization of the solenoid. In the present instance the output shaft 28 traverses the entire axial extent of solenoid case 20 and extends outwardly beyond both ends.

Figure 2:
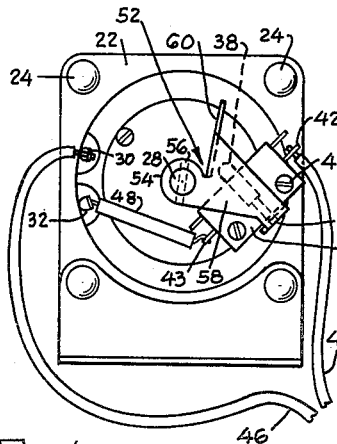
FIG. 2 is an end view taken along line 2—2 of FIG. 1.

Current is normally supplied for the operation of this device through suitable terminal means 30 and 32 which connect to the leads of the coil surrounding the core. When current is supplied to the device, the action of the solenoid results in an incremental angular movement of the output shaft 28. When current is removed the output shaft is returned to its position in preparation for re-activation on re-energization. In the normal solenoid, the rapidity of this action is dependent solely upon the techniques developed by the operator. In many devices, it has been found desirable to provide a rapid succession of these incremental angular movements so that the workpiece or element can rapidly be moved from one position to and through several other positions until it finally comes to rest at the desired position. It is, of course, an object of the present invention to disclose an embodiment of a device which will cause the output shaft 28 to successively oscillate between an activated and a de-activated position so long as a constant supply of current is provided to the device. The oscillating control means which is best seen in FIG. 2, and at the left-hand end of FIG. 1, includes what is known in the trade as a maintain-contact switch 36. By definition a maintain-contact switch is a switch which when moved from its initial position to a secondary position will remain in the secondary position until a second force is applied to the switch to either return it to its initial position or to another position. These also are known in the trade as reset switches and for purposes of disclosure the switch shown in FIG. 2 is of the type generally disclosed in United States Letters Patent No. 2,840,657; it can of course be of any other type falling within the definition. Switch 36 in this case has an actuator button 38 which traverses the entire switch case and is adapted to project beyond either the upper or the lower extremity of the switch case dependent upon the condition of operation of the switch. The switch can conveniently be mounted on the end of the solenoid by suitable means, such as screws 40, and is provided at opposite ends with terminal means 42 and 43. Conductors or leads 44 and 46 are connected to a suitable power source, not shown, with lead 44 being connected to one side of switch 36 and lead 46 being connected to one terminal 30 of the solenoid. A third lead 48 interconnects the opposite side of the switch to the second terminal 32 of the solenoid.

An operating member 52 is non-rotatably mounted on shaft 28 by suitable means such as hub 54 and pin or screw 56. Extending radially outwardly from hub 54 is arm 58. A pair of laterally extending flanges 60 and 62 project from arm 58 substantially parallel to output shaft 28 with flanges 60 and 62 lying in planes which are angularly disposed relative to radial arm 58. The configuration of the present device has arm 58 and its associated flanges 60 and 62 positioned in an overlying or embracing relationship with switch 36 and the opposite ends of its actuator button 38 respectively. The solenoid 10, switch actuator 38 and operating member 52 are shown in their initial position in FIG. 2 preparatory to a current from the power source being supplied to the leads 44 and 46. When power is supplied through the leads and switch 36, the output shaft 28 rotates an incremental angular amount. In the present instance, the shaft 28 rotates in a clockwise direction as viewed in FIG. 2.

Figure 3:
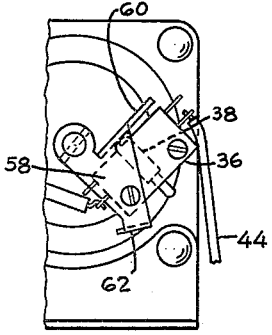
FIG. 3 is an end view similar to FIG. 2 but showing the output shaft in a rotated position.

Rotation of output shaft 28 brings flange 60 into sliding engagement with the upper end of actuator 38 and opens the circuit by actuating the switch as best seen in FIG. 3. De-energizing the solenoid mechanism allows the internal spring portion of the solenoid to return the shaft 28 to its initial position as seen in FIG. 2. As shaft 28 is rotated in a counterclockwise fashion, flange 62 is brought into engagement with the lower end of actuator button 38 resetting the switch to its initial load-carrying condition. If the power provided through leads 44 and 46 respectively is continuous, the cycle of energization and de-energization of the solenoid will repeat so long as the power source remains continuous and uninterrupted.

At the opposite end of solenoid 10 and acted upon by the opposite end of shaft 28 is the ratchet or escapement assembly 12. Mounted on screws 24 and spaced by suitable means such as sleeves 64 from the mounting plate 22 is a second plate-like member 66. Plate 66 is centrally apertured co-axial with output shaft 28 and adapted to accept and journal a driven shaft 70 whose opposite end conveniently can be journaled in a third plate-like member 71 spaced from plate 66.

Figure 6:
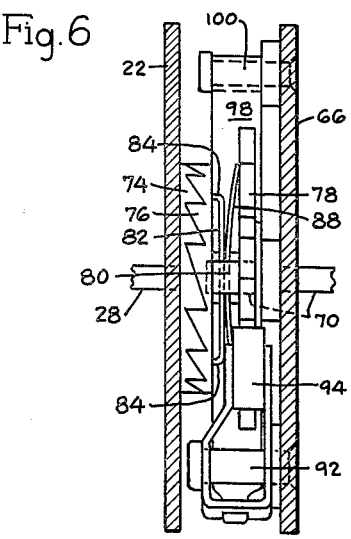
FIG. 6 is an enlarged partial sectional view of the centrally located ratchet mechanism shown in FIG. 1, various elements having been removed for the sake of clarity.

Reference now should be had to FIG. 6, which is an enlarged view of the ratchet assembly shown in FIG. 1, with the exception that the screws 24 and sleeves 64 have been eliminated for purposes of clarity. It can be more clearly seen in this view that the end of output shaft 28 opposite to the shaft end carrying the operating member 52 is journaled through mounting 22.

The ratchet or escapement assembly includes a pair of complementary ratchet and pawl members 74 and 76 respectively. The latter members are in the form of face-type toothed clutch plates which have a plurality of saw-toothed edge teeth peripherally arranged on their mating face surfaces. Ratchet 74 is co-axially mounted in a fixed fashion on shaft 28 by keying, brazing or other suitable means. Pawl member 76 is mounted in a free floating fashion on one end of driven shaft 70 which extends into the space between plates 22 and 66. Pawl 76 is provided with a plurality of apertures spaced about its face for purposes best set forth hereinafter.

Figure 4:
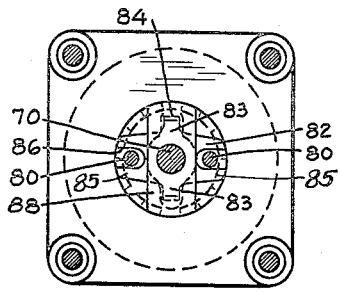
FIG. 4 is a partial sectional view taken along line 4—4 of FIG. 1.

A star wheel 78 is fixedly mounted to driven shaft 70 and is spaced along the axis thereof intermediate pawl member 76 and plate 66. Extending outwardly from star wheel 78 are one or more drivepins or rods 80 which project in the direction of pawl 76 and are adapted to be accepted in one or more of the aforementioned apertures therein. Mounted on shaft 70 and positioned intermediate the pawl 76 and starwheel 78 is a generally cruciform shape driver 82, which can be best seen in FIG. 4. Two opposed arms 83 of driver 82 are provided with axially extending tabs 84 adapted to be accepted in apertures of the pawl 76. Intermediate the arms 83 is a second pair of opposed arms 85, each having a slot 86 extending inwardly from the extremity thereof and adapted to accept the drivepins 80. The driver 82 is free to move axially on shaft 70. Also positioned on shaft 70 and intermediate driver 82 and starwheel 78 is compressed spring 88. Spring 88 bears on starwheel 78 and provides an axial thrust against pawl 76 through driver 82 to maintain the pawl in rotatable contact with ratchet member 74.

A detent member 90 is provided adjacent starwheel 78. It is pivotally mounted on pin 92 extending through plate 66 and has at one end thereof a roller 94 for engagement with the edge of the starwheel, said roller being of such a diameter as to be suitably accepted within the interdential spaces of the starwheel teeth. The opposite end of detent member 90 is provided with a plurality of apertures 96 suitable for the acceptance of one end of a C-shaped compression spring 98 which has its opposite end rotatably mounted on pin 100, said pin 100 being positioned on the opposite side of starwheel 78 from pin 92 whereby the compression spring 98 encircles one side of the starwheel. The plurality of apertures 96 permit the adjustment of the amount of force wheel 94 places against starwheel 78 by varying the lever arm distance between the pivot pin 92 and the end of the lever arm.

Figure 7:
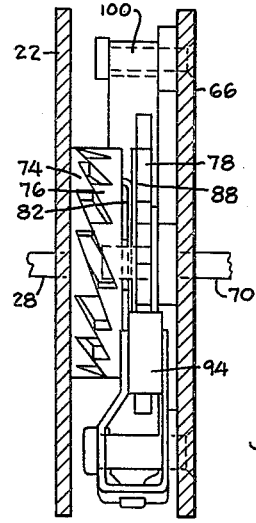
FIG. 7 is a partial sectional view of the device shown in FIG. 6 in an intermediate operative position.

In the operation of this device the rotary solenoid moves the output shaft 28 an incremental angular amount thus turning ratchet 74 a similar angular amount. The pawl 76, driver 82 acting on drivepins 80 and thence starwheel 78, which is attached to the driven shaft 70, move said shaft 70 a similar angular increment. When the current impulse through the solenoid per se is removed, output shaft 28 returns to its initial position. Detent member 90, however, acting on starwheel 78 restrains the driven shaft 70 from returning to the initial position and through drivepins 80 retains the pawl 76 in the new position. The force of the detent roller 94 acting on starwheel 78 is controlled by the positioning of spring 98 in apertures 96 whereby said force is greater than the spring force urging the return of the solenoid to its initial position but less than the power of the solenoid to rotate to a new position during energization. Ratchet 74 as it rotates against the restrained pawl 76 utilizes the cam surfaces of the teeth and forces a compression of spring 88 in the fashion shown in FIG. 7 until such time as the output shaft 28 and the attached ratchet 74 have assumed the initial angular position. Thusly, a drive mechanism is provided which results in successive angular incremental movement of the driven shaft 70 in a singular direction.

Figure 5:
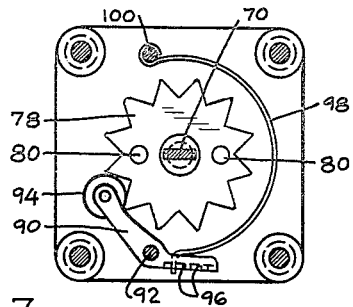
FIG. 5 is a partial sectional view taken along line 5—5 of FIG. 1.

The work element 14 is included in the disclosure to show a typical application of this type of drive mechanism. The shaft 70 along a portion of its length can conveniently be non-circular in cross section, as seen in FIGS. 1 and 5, for acceptance within a plurality of wafer switches 104 spaced along the output shaft and supported by extensions of the screws 24 extending to plate 71. The non-circular configuration of shaft 70 eliminates the necessity of fixedly fastening the switch members to the shaft but rather permits the use of spacer members 106 to simplify the assembly.

Thus the embodiment of this invention disclosed hereinabove permits an operator to rapidly rotate a workpiece in a substantially continuous succession of incremental angular steps. In certain instances, as for example, certain types of solenoids which can inherently only expose one end of their output shaft, not shown, it is convenient to mount the oscillating control 16 at the opposite end of the solenoid and to place same on the single end extension of output shaft 28. This can be accomplished (but is not shown) by interposing the switch and oper- Other variations will be apparent to those skilled in the art, and it is my intention that I should be limited only by the appended claims.

I claim:

1. A repeating rotary solenoid comprising a rotary solenoid having an output shaft which extends beyond at least one end of said solenoid, said solenoid having means for incrementally rotating said shaft upon energization and further having means for returning said shaft to its initial position upon de-energization, a maintain contact switch interposed in the electrical circuit of said solenoid and mounted adjacent one end of said solenoid, an operating member fixedly mounted on said output shaft at the same end and adapted to directly operate said switch upon rotation of said output shaft during the energization cycle, said operating member consisting of a radially extending arm from said output shaft with a yoke integral therewith adapted to embrace the operating element of said maintain contact switch, whereby rotation of said shaft causes the operating member to directly operate said switch first to a de-energized position and then to an energized position to respectively and successively break and then make the circuit relative to a source of energy.

2. A repeating rotary solenoid comprising a rotary solenoid having an axially fixed output shaft which extends beyond at least one end of said solenoid, said solenoid having means for incrementally rotating said shaft upon energization and further having means for returning said shaft to its initial position upon de-energization, a maintain contact switch interposed in the electrical circuit of said solenoid and mounted adjacent one end of said solenoid, an operating member mounted on said output shaft at the same end and adapted to directly operate said switch upon rotation of said output shaft during the energization cycle, said operating member comprising a substantially planar radially extending lever arm having a pair of flange members extending laterally substantially parallel to the shaft axis and lying in planes angularly disposed relative to said radially extending lever arm, whereby rotation of said shaft causes the operating member to directly operate said switch and thereby break the circuit to a source of energy.

3. A device of the type claimed in claim 2 wherein said switch means has an actuator button which traverses the switch's upper and lower extremities, said switch being a maintain contact switch which can be opened and reset to load carrying condition by movement of said button, said flanges being positioned adjacent opposite ends of said actuator, incremental rotation of said output shaft moves one flange into contact with one end of said actuator and moves said actuator in such a fashion as to break the circuit, rotation of said output shaft to the initial position upon de-energization of the solenoid brings the second flange into contact with the opposite end of said actuator returning said switch to its initial load carrying condition whereby a continuous source of energy supplied to said switch and solenoid circuit results in a substantially continuous oscillatory motion of said solenoid as said switch is opened and closed by the incremental rotation of the output shaft.

4. A solenoid drive mechanism including a rotary solenoid, an axially fixed output shaft extending through and beyond opposite ends of said solenoid, said solenoid upon energization rotating said shaft an incremental angular amount and returning same to its initial position upon de-energization, a power source for energizing said solenoid, a maintain contact switch mounted adjacent one end of said solenoid and connected intermediate the power source and the solenoid and adapted to interrupt the power supply, an operating member mounted on the output shaft adjacent the switch adapted to directly operate the switch during the incremental rotation of the shaft thereby interrupting the power supply, a driven shaft positioned adjacent the opposite end of said solenoid, means adjacent said opposite end and cooperatively interconnecting said driven shaft with the adjacent end of the output shaft and adapted to intermittently rotate said driven shaft in a single direction and a restraining member to retain same in a fixed position while said output shaft is returned to its initial position during de-energization of the solenoid.

5. A device of the type claimed in claim 4 wherein said solenoid will successively oscillate so long as the power supply is continuous.

6. A device of the type claimed in claim 4 wherein said switch is adapted to be oscillated between a make and break condition, said operating member including a radially extending arm having means mounted thereon extending perpendicularly thereto generally in the same direction as the axis of the output shaft and overlying said switch in embracing relation, for actuating said switch to a break condition during energization of the solenoid and to a make condition during de-energization of the solenoid whereby a constant supply of power results in a repeating operation of said solenoid as its incremental rotation and thence return to initial position first breaks and then makes the connection to the power source.

7. A device of the type claimed in claim 4 wherein said restraining member includes a star wheel mounted on said driven shaft, a detent member pivoted adjacent one edge of said star wheel and having one end spring urged into resilient engagement with said star wheel, a C-shaped spring having one end anchored at the opposite edge of said star wheel and having the opposite end acting on said detent member on the opposite side of its pivot from the end in engagement with the star wheel to facilitate aggressive engagement therewith, said detent member having a plurality of apertures spaced incrementally along said opposite side from said pivot, each of said apertures adapted to accept said opposite end of said C-shaped spring whereby the force of engagement of said detent member with said star wheel can be readily adjusted by varying the lever arm distance from said pivot to the specific aperture occupied by said C-shaped spring.

References Cited in the file of this patent

UNITED STATES PATENTS

| | | |
|---|---|---|
| 2,478,469 | Nelson | Nov. 8, 1949 |
| 2,501,950 | Leland | Mar. 28, 1950 |
| 2,881,621 | Prendergast et al. | Apr. 14, 1959 |